United States Patent [19]

Zemlin

[11] 3,721,645

[45] March 20, 1973

[54] POLYURETHANES STABILIZED WITH 1,2,3-, 1,2,4- 1,2,5-, AND 1,3,4-TRIAZOLES

[75] Inventor: John C. Zemlin, Reading, Mass.

[73] Assignee: Liner Technology, Inc., Burlington, Mass.

[22] Filed: Feb. 25, 1971

[21] Appl. No.: 118,983

[52] U.S. Cl...260/45.8 N, 260/77.5 SS, 260/77.5 TB
[51] Int. Cl...........................C08g 51/60, C08g 22/32
[58] Field of Search .260/77.5 SS, 77.5 AC, 77.5 TB, 260/45.8 N, 45.9 R, 308 A, 308 R, 2.5 BB

[56] References Cited

UNITED STATES PATENTS

| 3,642,813 | 2/1972 | Kirchmayr | 260/308 A |
| 2,702,797 | 2/1955 | Rugg | 260/45.8 |
| 2,763,61 | 9/1956 | Grundmama et al. | 260/308 R |
| 3,431,189 | 3/1969 | Offenhauer et al. | 260/308 R |
| 3,213,058 | 10/1965 | Boyle et al. | 260/47 |

OTHER PUBLICATIONS

Elderfield, "Heterocyclic Compounds," Vol. 7, (1961) pages 385–6.

Primary Examiner—Donald E. Czaja
Assistant Examiner—H. S. Cockeram
Attorney—E. J. Berry and L. Rosen

[57] ABSTRACT

Improved process for preparation of stabilized but reactive polyurethanes, the stabilizer compositions containing amounts of either substituted or unsubstituted triazoles, and the polyurethane compositions prepared from di- or poly-isocyanates, polyols, and at least one of the selected triazoles.

8 Claims, No Drawings

POLYURETHANES STABILIZED WITH 1,2,3-, 1,2,4- 1,2,5-, AND 1,3,4-TRIAZOLES

This invention relates generally to an improved process for preparing various stabilized potentially reactive polyurethanes, the stabilized compositions containing substantial amounts of triazoles, both substituted and unsubstituted, the compositions being prepared from di- or poly-isocyanates, polyols and at least one of a group of triazoles.

Both the prior art methods and the commercial practice for preparing two-part curable polyurethanes are well known. Thus, as is well known, di- or poly-isocyanates can be mixed with suitable active hydrogen containing curatives such as long chain polyesters or polyethers combined with short-chain diols or polyols and with various di- or poly-functional amines. These mixtures when prepared at —NCO to active hydrogen ratios of approximately one will, upon standing at room temperature, or at elevated temperatures, cure to form useful elastomeric polymers. Once the mixtures are made, however, a limited period of time exists during which they can be utilized. This time is known variously as the pot-life or shelf-life of the mixtures and ranges from a few seconds up to perhaps a few days. Particularly in the case of injection molding polyurethanes it is desirable to have compositions which have a relatively long shelf-life but which can be processed at molding temperatures and then on subsequent heating, are capable of cross-linking to form stable thermoset polymers. Similar properties are desired in the case of powder coating as by fluidized bed or electrostatic spraying.

One approach to the preparation of stabilized injection molding polyurethanes is exemplified by the commercially available polyurethanes known by the trademark Texins, which are high molecular weight elastomeric materials containing small amounts of unreacted isocyanate. On heating, these isocyanate groups will react to form crosslinks and produce thermoset insoluble products. These isocyanate groups tend to react with moisture or with active hydrogens present in the polyurethane and therefore have a limited shelf life. Thus only a limited number of free isocyanate groups can be used in these compositions if they are to retain both their desirable high molecular weights and their ability to soften and flow at elevated temperatures. Unfortunately, with their limited ability to cross-link, the Texins are not then as resistant to creep at higher temperatures and to solvent attack as might be desired for these compositions. A way for overcoming this basic difficulty has been discovered. It involves the preparation of solid, potentially cross-linkable polyurethanes which are stabilized by the addition of a triazole so that on subsequent heating the polyurethane will react to become cross-linked but yet will have a long shelf life if such is required. This technique is so effective that compositions of thermoplastics have been stored for many months and are found readily converted into the thermoseting state by heating.

For the stabilizer any type of triazole may be used provided only that the substituted triazoles are not substituted at the imine nitrogen atom and the first atom of the substituting group is a carbon atom. In other words, compounds of the following types can be employed as the stabilizer of the invention:

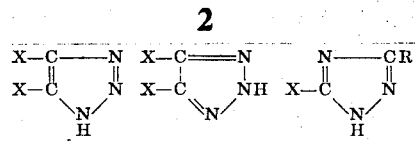

where the substituent X can be —H or

and R can be any organic grouping including hydrogen.

Examples of the useful triazole compounds are 1,2,3-triazole, 1,2,4-triazole, 4,5-diphenyl-1,2,3-triazole, 3-ethyl-1,2,4-triazole, 1,2,3-benzotriazole, 1,2,3-tolyl triazole and the like.

The triazole stabilizers are used in the polymer compositions at a concentration such that from about 0.1 to 1.0 equivalents of triazole is added for each equivalent of available isocyanate incorporated into the mixture. Thus, as an example, if 2,000 gms. of a prepolymer having an —NCO content corresponding to an equivalent weight of 1,000 was used in a composition in which 1,2,4-triazole was to be the stabilizer at an —NH to —NCO ratio of 0.5, then 69 gms. of 1,2,4-triazole should be added to obtain the results of the invention.

Although it is not precisely understood just how the triazoles stabilize the compositions, it is believed that the stabilization involves some sort of complex formation between the —NH group on the triazole and the isocyanate group. This complex is apparently thermally unstable and the isocyanate group is regenerated on heating. At room temperature this so-called complex appears to form preferentially over the urethane which would result from the isocyanate-hydroxyl reaction. Infrared spectroscopic studies show that the —NCO group disappears while the —OH group remains in an amount in inverse proportion to the amount of triazole added.

The polyurethane compositions can be prepared by mixing a polyisocyanate with the active hydrogen containing curatives and the stabilizer in any desired manner. Either the prepolymer method or the one-shot technique can be used. Both fabrication methods are well-known and have been found highly effective variants.

Any suitable organic compound containing active hydrogen atoms which are reactive with —NCO groups such as, for example, hydroxyl polyesters, polyhydric polyalkylene ethers, polyhydric polythioethers, polyacetals and the like may be used. These active hydrogen compounds are well known in the art.

Any suitable hydroxyl polyester can be used for the polymer formation such as, for example, the reaction product of a polycarboxylic acid and a polyhydric alcohol. Commonly a polycarboxylic acid is used in the preparation of the hydroxyl polyester such as, for example, adipic acid, succinic acid, sebacic acid, azelaic acid, phthalic acid, terephthalic acid, isophthalic acid and the like. Any suitable polyhydric alcohol may be used in the reaction with the selected polycarboxylic acid to form a polyester such as, for example, ethylene glycol, propylene glycol, glycerol, butylene glycol, neopentyl glycol, amylene glycol, hexanediol, bi-(hydroxy-methyl-cyclohexane) and the like. The hydroxyl polyester may contain urethane groups, urea groups, amide groups, chalcogen groups and the like. Thus, the hydroxyl terminated polyesters include as a general category in addition to hydroxy-terminated polyesters, also hydroxyl terminated polyester amides, polyester urethanes, polyetheresters and the like. The preparation of these materials is well known in the art.

Any suitable polyhydric polyalkylene ether may be used such as, for example, the condensation product of any alkylene oxide with a small amount of a compound containing active hydrogens such as, for example, water, ethylene glycol, propylene glycol, glycerol, hexane triol, butylene glycol, amylene glycol and the like. Suitable alkylene oxide condensates may also be used such as, for example, the condensates of ethylene oxide, propylene oxide, butylene oxide, amylene oxide and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology," volume 7, pages 257–262, published by Inter-science Publishers in 1951.

Suitable polylactones may be used and among which poly e-caprolactones are particularly useful.

Any suitable chain extending agent containing active hydrogen atoms which are reactive with NCO groups and having a molecular weight less than about 800 may be used as, for example, water, ethylene glycol, propylene glycol, butylene glycol, 1,4-butanediol, butenediol, butynediol xylylene glycol, neopentyl glycol, 2,3-butynediol, 1,4-phenylene-bi-(beta-hydroxy ethyl ether), hexanediol, diethylene glycol, dipropylene glycol, glycertol, hexanetriol, pentaerythrietol and the like; polyamines such as for example, ethylene diamine, butylene diamine, hexamethylene diamine, cyclohexylene diamine, tolylene diamine, xylylene diamine, 4,4'-methylene-bis(2-chloroaniline), 3,3 dichloro-4,4'biphenyl diamine, 4,4'diamino diphenylmethane and the like; alkanol amines such as, for example, ethanol amine, 2,2-dimethyl propanol amine and the like; water, hydrazine, substituted hydrazines such as, for example, N,N'dimethyl hydrazine, 1,6-hexamethylene-bis-hydrazine, carbodihydrazide, hydrazines of dicarboxylic acids and the like.

Suitable organic polyisocyanates may be used such as, for example, 2,4-tolylene diisocyanate, 4,4'diphenyl methane diisocyanate, 2,2'-diphenylpropane-4,4'-diisocyanate, 3,3'-dimethyl diphenyl methane-4,4'-diisocyanate, p-phenylene diisocyanates, m-phenylene diisocyanate, dibenzyl-4,4'-diisocyanate, xylylene diisocyanate, 1,5-naphthylene diisocyanate, diphenyl-4,4'-diisocyanate, hexamethylene diisocyanate, polyphenyl methylene polyisocyanate, triphenyl triisocyanate and the like. Any suitable uretdione diisocyanate may be used such as, for example, the dimers of any of the above mentioned diisocyanates.

This process is particularly effective with compositions that are solid at room temperature and for preparation of such compositions the so-called crystallizing polyols are often used. Typical examples are polyethylene adipates, poly-1,4-butylene adipates, polytetramethylene glycol ethers, poly e-caprolactones and the like, which have molecular weights of 1,000 and more. These solid compositions find particular utility as coating resins, injection molding resins, nonmigratory low temperature brittleness improvers for polyvinyl chloride resins, rotational casting resins, and the like.

A particular advantage of these solid compositions results from their low melting point. Many injection molding resins or fluidized bed resin powders require temperatures of 400° F. and higher for adequate flow. The compositions of this invention on the other hand can often be melted and cured at temperatures below 250° F. and even below 200° F., these lower temperatures being a distinct advantage. A further advantage of the compositions of the invention is found in their low melt viscosities, which at processing temperatures is often no more than a few thousand centipoises as compared with viscosities of tens and hundreds of thousands of centipoises obtained with other known molding resins and powders of the art.

The preparation of these stabilized compositions usually requires the presence of a catalyst to ensure adequate cross-linking on heating. In order to maintain easy processability during ultimate use of these compositions, it has been found desirable to use a latent catalyst of the type, for example as disclosed in U.S. Pat. No. 3,474,075; however, other catalysts, active at room temperature, can also be used therewith if provisions are made to minimize reaction exotherms by cooling, rapid mixing of small quantities of composition, and the like. A very high exotherm could result in complete cross-linking since the stabilizing effect of the included triazoles decreases at temperatures above about 50° C.

The stabilized mixtures can be readily converted to the cross-linked state by heating. Temperatures as low as 50° C. can cause the mixture to "destabilize" and cure. In practice, however, temperatures of 100° C. and higher are preferred to obtain the fast cure rates desired for many manufacturing operations.

The addition of other additives useful in coatings, moldings, and in the other contemplated uses may be found desirable. These additives include pigments, fillers, antioxidents, ultraviolet screening agents, heat stabilizers, blowing agents and the like, many of which are included in compositions specially created for individual end uses.

It is to be understood that the examples presented hereinbelow are typical examples of the invention hereof and that it is in no way intended to limit the invention specifically thereto.

EXAMPLE 1

A prepolymer was prepared by reacting 1 mole of a 3,000 molecular weight polyester diol (prepared from adipic acid and 1,4-butanediol) with 2 moles of a commercial grade mixture of 80% 2,4-toluene diisocyanate and 20% 2,6-toluene diisocyanate for 3 hours at 80° C. The prepolymer thus prepared had a —NCO content of 2.5 percent corresponding to an equivalent weight of 1,680. Approximately 1.0 equivalent of the prepolymer, which melted at about 50° C., was mixed rapidly with a molten blend, at a temperature of 60° C., of the following ingredients:

| | | |
|---|---|---|
| 1,4-Butanediol | 0.5 equiv. | 22.5 gms. |
| 1,2,6-Hexanetriol | 0.5 " | 22.5 " |
| 1,2,4-Triazole | 0.5 " | 33.5 " |
| Triphenylleadacetate | 0.5% | 8.8 " |

After mixing the above indicated ingredients for 1 minute the composition was poured onto a polyethylene coated metal table and spread to a thickness of about one-eighth inch. After 30 min. the solid, brittle sheet of composition which resulted therefrom was broken into granules of about one-eighth inch diameter. The granules were then stored in a closed container at room temperature for further testing. A portion of these granules, however, was mixed with about 10 percent dry ice and readily ground in a Waring Blender to less than 100 mesh, after which the resulting powder was kept at room temperature for testing.

EXAMPLE 2

Example 1 was repeated exactly except that the 1,2,4-triazole was omitted from the mixture. The product appeared physically identical and both the granules and powder were sampled for testing.

The testing and results thereof were as follows: Periodically, samples of granule and powder were tested for their ability to melt, fuse and gel. The test involved placing about one-half gm. of powder and one-half gm. of granule in a pile on an aluminum plate which was maintained at 150° C. The time required for gelation if it occurred is recorded below. Failure of the sample to melt is also reported.

|  | Gelation Time | | | |
| --- | --- | --- | --- | --- |
|  | 1 week | 2 weeks | 12 weeks | 16 weeks |
| Ex. 1A granules | 8 min. | 8 min. | 6 min. | 6 min. |
| Ex. 1B powder | 6 min. | 6 min. | 5 min. | 6 min. |
| Ex. 2A granules | 5 min. | did not melt | | |
| Ex. 2B powder | 5 min. | did not melt | | |

The gelled coating from the 1 week test was a hard, tough elastomer in every case. Similar properties were noted from all subsequent reported tests of Example 1 materials. The triazole produced long shelf stability in Example 1 — while the composition without it (Example 2) had practically no shelf life, a distinct disadvantage with this type of product when used in commerce.

EXAMPLE 3

1,000 grams of an approximately 2,000 molecular weight poly e-caprolactone diol (Niax Polyol D-560) was reacted with 174 grams of tolylene diisocyanate (Hylene TM, a 80:20 mixture of the 2,4 and 2,6 isomers) to prepare an isocyanate terminated prepolymer having a melting point of about 50° C., and having an equivalent weight by —NCO assay of 1,270. This prepolymer was used to prepare a series of compositions as follows:

|  | Equivalent wt. | A | B | C | D |
| --- | --- | --- | --- | --- | --- |
| Prepolymer | 1,270 | 1.1 equivalent | 1.1 equivalent | 1.1 equivalent | 1.1 equivalent |
| Niax Polyol D-560 | 1,020 | 0.2 equivalent | 0.2 equivalent | 0.2 equivalent | 0.2 equivalent |
| 1,2,6-hexanetriol | 45 | 0.6 equivalent | 0.6 equivalent | 0.6 equivalent | 0.6 equivalent |
| 1,4-butanediol | 45 | 0.2 equivalent | 0.2 equivalent | 0.2 equivalent | 0.2 equivalent |
| Benzotriazole | 119 | None | 0.2 equivalent | 0.6 equivalent | 1.0 equivalent |
| Dibutylleaddilaurate |  | 0.15% | 0.15% | 0.15% | 0.15% |

In each case the molten prepolymer was mixed with a blend of the other ingredients, degassed under vacuum of 1 mm Hg for a few minutes, then cast as a 1/16 inch film on a cold metal table top. After 1 hour each of the resulting brittle sheets was broken up and stored under dry nitrogen at room temperature for several months. Periodically samples were tested for melting and gelation properties at 150° C. with the following results:

| Sample | 2 weeks | 4 weeks | Gelation time after 9 weeks | 15 weeks | 31 weeks |
| --- | --- | --- | --- | --- | --- |
| A | did not melt | | | | |
| B | 5 min. | 5 min. | 2 min. | 2 min. | 1 min. |
| C | 10 min. | 10 min. | 5 min. | 5 min. | 5 min. |
| D | 10 min. | 10 min. | 5 min. | 5 min. | 5 min. |

It can be seen that even a small amount of triazole produces marked stabilization of the potentially cross-linkable mixture and yet the presence of even essentially equivalent amounts of triazole and isocyanate did not prevent curing at higher temperatures. In each case the gelled polymer was a hard (Shore D 50) tough elastomer. No significant difference in physical properties could be observed between cured samples of A, B, C or D.

EXAMPLE 4

The prepolymer of Example 3 was used to compare the stabilizing effect of a number of compounds as follows:

| | |
| --- | --- |
| Prepolymer | 1.1 equiv. |
| Niax Polyol D-560 | 0.2 " |
| 1,2,6-Hexanetriol | 0.6 " |
| 1,4-Butanediol | 0.2 " |
| Dibutylleaddilaurate | 0.15% by weight |
| Stabilizer | 0.6 equiv. |

The mixtures were prepared, stored under dry $N_2$ at room temperature, and periodically checked for gel time at 150° C. as in Example 3. The stabilizers tested and the shelf life for each is presented below:

| Stabilizer | Mixture Shelf Life |
| --- | --- |
| 1,2,4-Triazole | over 6 months |
| 4,5-Diphenylimidazole | less than 5 days |
| Imidazole | less than 5 days |
| Benzotriazole | over 1 year |
| 2-Methylbenzimidazole | less than 2 days |
| Benzimidazole | less than 2 days |
| 1,2,3-Tolyltriazole | over 6 months |

All of the triazoles tested produced excellent stabilization.

EXAMPLE 5

An additional batch of composition B used in Example 3 was prepared and broken up into granules. These granules were then mixed with an equal amount of dry ice and ground to 100 mesh size in a Waring blender. The resulting powder was then mixed with varying amounts of a commercial polyvinylchloride resin, Bakelite QYTY-7.

The mixing was done in a high intensity powder mixer using full cooling to keep the temperature below 50° C. The blends were then sheeted out on two roll mill using a temperature of 325° F. for fusing, followed by cooling the roll to 250° F. before removing the sheet. The sheets were pressed for 2 minutes at 300° F. to form ⅛ inch test strips.

The appearance and properties of the test pressings were as follows:

| Wt. Ratio PVC/Urethane | Appearance | Hardness Shore A | Tensile psi | % Elongation at Break |
|---|---|---|---|---|
| 10/90 | Clear | 100 | 5000 | 50 |
| 25/75 | Clear | 98 | 7000 | 200 |
| 50/50 | Clear | 90 | 4500 | 500 |
| 75/25 | Clear | 80 | 4500 | 600 |

The powdered urethane obviously blends extremely well with the PVC over a wide range of concentrations.

EXAMPLE 6

A polyester prepared from adipic acid and 1,6-Hexanediol and having a hydroxyl number of 54 mg KOH/gm (which corresponds to a molecular weight of about 2,100) was made into an isocyanate terminated prepolymer by reaction with two mols of diphenylmethane-4,4'-diisocyanate per mol of polyester. This prepolymer was mixed at 70° C. as follows:

| | |
|---|---|
| Prepolymer | 1.05 equivalents |
| Glycerin | 0.6 " |
| 1,6-Hexanediol | 0.4 " |
| 1,2,4-Triazole | 0.4 " |
| Dibutylleaddilaurate | 0.5% by weight |

After 1 minute of mixing, the preparation was spread on a chilled stainless steel plate and permitted to crystallize. It was labeled as the "prepolymer" sample.

A similar preparation was made except that 1.0 equivalents of the polyester was used instead of the prepolymer. After all of the ingredients were well mixed, 1.05 equivalents of diphenylmethane-4,4'-diisocyanate was then stirred into the mixture — again at 70° C. — and after 1 minute this preparation was also chilled and crystallized on the stainless steel plate. This was designated as the "one-shot" sample.

Both the prepolymer and the one-shot samples cured on heating to 150° C. as follows:

| Sample | Gelation time after 1 week | 8 weeks | 16 weeks |
|---|---|---|---|
| Prepolymer | 5 min. | 4 min. | 4 min. |
| One-shot | 8 min. | 5 min. | 5 min. |

The two preparation techniques produced essentially equivalent results.

EXAMPLE 7

The prepolymer of Example 3 was used to prepare the following compositions:

| | A | B | C | D |
|---|---|---|---|---|
| Prepolymer | 1.1 equiv. | 0.5 equiv. | 1.1 equiv. | 1.1 equiv. |
| Diphenylmethane-4,4'-diisocyanate | | 0.6 " | | |
| Glycerin | 0.4 " | 0.4 " | 0.4 " | 1.0 " |
| 1,4-Butanediol | 0.3 " | 0.6 " | 0.6 " | |
| Benzotriazole | 0.4 " | 0.4 " | 0.4 " | 0.4 " |
| 4,4'-Methylene bis (ortho-chloroaniline) | | | | |
| Tribasic lead maleate | 0.5 | 0.5% | 0.5% | 0.5% |

Each composition was prepared as in Example 3 and stored in chip form. Small chips were periodically tested for melting and gelation properties at 150° C. and after 4 months larger amounts of chips were compression molded at 150° C. into cured sheets for the measurement of physical properties. The results of the tests are as follows:

| | A | B | C | D |
|---|---|---|---|---|
| Gel time after 1 wk. storage | 7 min. | 6 min. | 5 min. | 3 min. |
| " " " 8 wks. " | 7 min. | 5 min. | 5 min. | 3 min. |
| " " " 16 wks. " | 7 min. | 5 min. | 5 min. | 3 min. |
| Physical properties of molded sheet -- | | | | |
| Tensile - psi | 2700 | 3200 | 3600 | 2600 |
| Elongation - % | 500 | 700 | 800 | 700 |
| Split Tear Strength - psi | 80 | 120 | 190 | 90 |
| Hardness - Shore A | 95 | 94 | 95 | 85 |

What is claimed is:

1. An improved polyurethane polymer composition containing small but effective stabilizing amounts of a triazole selected from the group consisting of 1,2,3-triazole; 1,2,4-triazole; 1,2,5-triazole; 1,3,4-triazole; 4,5-diphenyl-1,2,3-triazole; 3-ethyl-1,2,4-triazole; 1,2,3-benzotriazole; and 1,2,3-tolyltriazole.

2. The composition of claim 1 in which the triazole is 1,2,3-triazole.

3. The composition of claim 1 in which the triazole is 1,2,5-triazole.

4. The composition of claim 1 in which the triazole is 1,2,4-triazole.

5. The composition of claim 1 in which the triazole is 1,3,4-triazole.

6. The composition of claim 1 in which the triazole is present in amounts of from 0.1 to 1.0 equivalents per equivalent of isocyanate.

7. The composition of claim 1 in which the triazole is 1,2,3-benzotriazole.

8. The composition of claim 1 in which the triazole is 1,2,3-tolyltriazole.

* * * * *